United States Patent
Cardina et al.

(10) Patent No.: US 8,369,850 B2
(45) Date of Patent: *Feb. 5, 2013

(54) SYSTEM AND METHOD FOR IMEI DETECTION AND ALERTING

(75) Inventors: Donald M. Cardina, Lawrenceville, GA (US); Anastasios L. Kefalas, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/369,184

(22) Filed: Feb. 8, 2012

(65) Prior Publication Data

US 2012/0142329 A1    Jun. 7, 2012

Related U.S. Application Data

(63) Continuation of application No. 12/267,401, filed on Nov. 7, 2008, now Pat. No. 8,126,432, which is a continuation of application No. 10/917,382, filed on Aug. 13, 2004, now Pat. No. 7,474,894.

(60) Provisional application No. 60/585,602, filed on Jul. 7, 2004.

(51) Int. Cl.
*H04W 4/00* (2009.01)

(52) U.S. Cl. .................... 455/432.3; 455/433
(58) Field of Classification Search .............. 455/558, 455/559, 557
See application file for complete search history.

(56) References Cited

U.S. PATENT DOCUMENTS

| 5,388,212 A * | 2/1995 | Grube et al. ............... 726/22 |
| 2005/0059430 A1* | 3/2005 | Beeman et al. ............ 455/558 |
| 2005/0153741 A1* | 7/2005 | Chen et al. ................ 455/558 |
| 2009/0069001 A1* | 3/2009 | Cardina et al. ............ 455/418 |

* cited by examiner

*Primary Examiner* — Melody Mehrpour
*Assistant Examiner* — Emem Stephen
(74) *Attorney, Agent, or Firm* — Moazzam & Associates, LLC

(57) ABSTRACT

A system and method for detecting and storing information regarding a mobile communications device within a mobile communications network. Initially, a first data record is received at a subscriber/device database comprising subscriber/device data. Next, a second data record is received at the subscriber/device database comprising additional subscriber/device data. A first data record of a subscriber may then be compared to a second data record of the same subscriber, and if the first data record is different from the second data record a service provider may be notified.

20 Claims, 2 Drawing Sheets

SYSTEM AND METHOD FOR IMEI DETECTION AND ALERTING

This application is a continuation of U.S. patent application Ser. No. 12/267,401, filed Nov. 7, 2008, now U.S. Pat. No. 8,126,432; which is a continuation of U.S. patent application Ser. No. 10/917,382, filed Aug. 13, 2004, now U.S. Pat. No. 7,474,894; which claims priority to U.S. Provisional Patent Application Ser. No. 60/585,602, filed Jul. 7, 2004; the contents of which are hereby incorporated by reference herein in their entirety into this disclosure.

BACKGROUND

1. Field of Invention

The present invention relates generally to collection, storage, and use of data transmitted from mobile telecommunications devices. More particularly, the present invention relates to collection and mining of data related to device identity data, the Internal Mobile station Equipment Identity (IMEI), and of subscriber identity data related to the Subscriber Identity Module (SIM) of mobile telecommunications devices.

2. Background of the Invention

It is common practice in the telecommunications industry for a service provider (SP) to record information regarding a mobile communication device at the time of activation of service. For example, each communications device's IMEI contains information regarding that device that tells the SP what type of device is being used, which in turn lets the SP know what functionality is available on that particular device. With GSM, PCS, and other such phone systems, the device has a removable SIM card that contains, among other things, information related to the user and that allows the device to function with the particular SP's network. Each time a user connects to a network, the information on the SIM card is transmitted and permits the user to utilize the services of the network. Most SPs, however, only know the relationship between the SIM card and the IMEI at the time of activation or possibly at any other time when a subscriber happens to bring the device in, for example, to be serviced.

Because the user's account information necessary to connect to a network is contained wholly within the user's SIM card, a user may transfer the SIM card from one device to another without the SP ever learning of the switch. While this functionality allows freedom for users to change devices without need for involving technicians or service representatives of the SP, it also presents problems for both users and SPs. Additionally, prior art mobile communications systems for time division multiple access (TDMA) subscribers did not encounter such problems because the mobile identification number (MIN)/electronic serial number (ESN) combination for the subscriber must be in the home location register (HLR) in order for the handset to be used. Subscribers would be unable to make changes to their equipment without involving the service provider.

As mentioned above, the IMEI information allows the SP to know what functionality the particular device supports. If a user has switched devices unbeknownst to the SP, however, the user or the SP or both may encounter problems related to interaction between the service and the new device. In addition, when a user makes a service call, if the SP service representative believes that the user has a device different from the device actually in use, then the user may not receive optimal service during the service call.

There are also security issues that may result from SIM card portability. Because the SIM card is essentially the "brains" of a mobile device, a stolen or lost phone may be used by anyone with an active SIM card by simply replacing the SIM card into the stolen or lost phone. Because the SP often does not check IMEI versus SIM information, a thief or person who finds a lost phone can use that phone with impunity.

BRIEF SUMMARY OF THE INVENTION

It would be desirable to collect information from mobile telecommunications devices to track SIM data in conjunction with IMEI data to allow SPs to track a user's device in real-time or near real-time so that the SP is aware of the device being used by a subscriber with better accuracy than is currently provided. This information can be used to enhance service to subscribers in many ways. For example, by matching SIM data with IMEI data, an SP may determine that a device that has been reported lost or stolen is being used and may track and possibly locate the missing device or merely disable service to any user attempting to use that particular device.

In another example, by knowing what functionality is available to a particular user, the SP may tailor what services are offered to that particular subscriber so as to maximize its marketing efforts. Similarly, when one user is attempting to utilize enhanced features with another user, knowledge of both users' device information will better allow the SP to inform each party of the other user's capabilities. Such user to user features are described in more depth in U.S. application Ser. No. 10/902,808, now U.S. Pat. No. 7,333,836, entitled "System and Method for Providing Mobile Device Capability to a Wireless Network Subscriber" by Emily Soelberg, filed Aug. 2, 2004. In this manner, for example, a first user would know before attempting to send, for example, a video message, that the intended target user does not have such capability to receive a video message. These and other benefits will be described in more detail in the detailed description below.

According to a first exemplary embodiment, a method for detecting and storing information regarding a mobile communications device within a mobile communications network is disclosed. Initially, a first data record is received at a subscriber/device database comprising subscriber/device data. Next, a second data record is received at the subscriber/device database comprising additional subscriber/device data. A first data record of a subscriber may then be compared to a second data record of the same subscriber, and if the first data record is different from the second data record a service provider may be notified.

DETAILED DESCRIPTION OF THE INVENTION

Figure 1:
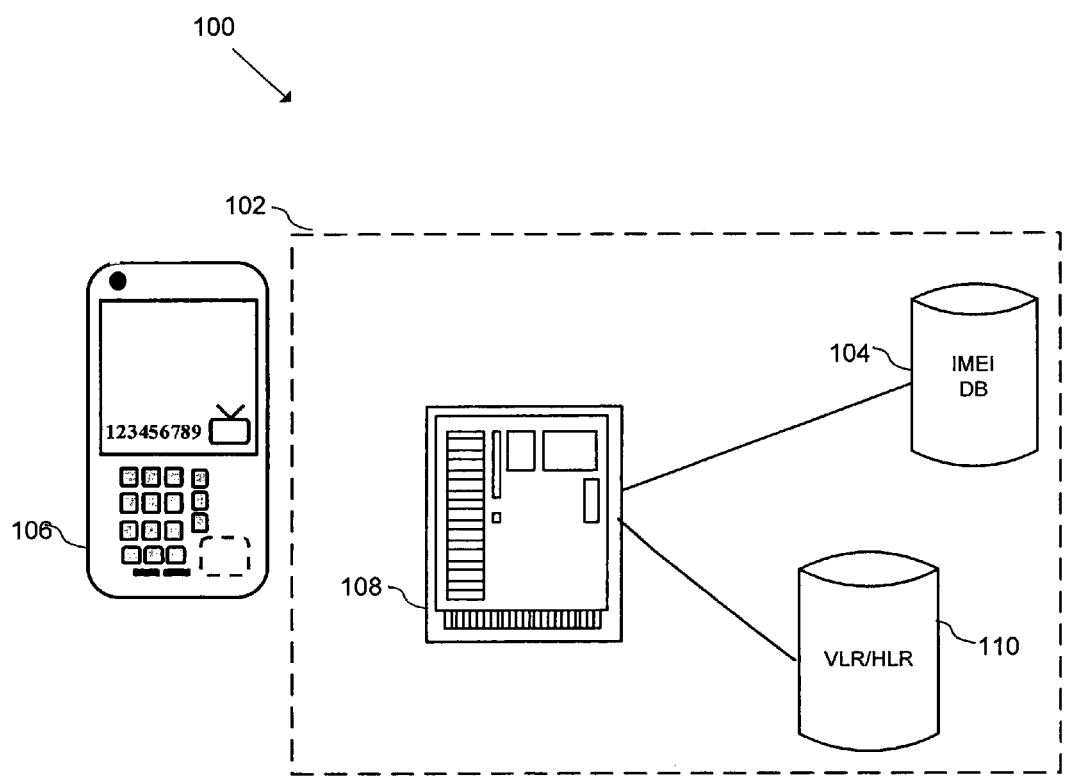
FIG. 1 is an exemplary system for storing subscriber/device data within a mobile communications network to a database.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

FIG. 1 depicts a system 100 for enabling storage of IMEI information transmitted or otherwise received within a cellular network 102 for storage in an IMEI database 104. The IMEI information is linked to and may be received from a mobile station (MS) 106 or it may be input directly by a service provider. When MS 106 registers with network 102, system 100 can collect mobile station information including the IMEI, which is a feature common to all GSM mobile stations currently in use. For example, mobile switching center (MSC) 108 may request an IMEI from MS 106, or the IMEI may be automatically forwarded from MS 106 during a registration process, and temporarily stored in VLR/HLR 110. Either an HLR (Home Location Register) or a VLR (Visitors' Location Register) would be capable of capturing the above described information. Generally, a VLR is a local database maintained by the cellular provider in whose territory a subscriber is roaming. The cellular provider providing the roaming service queries the HLR of the subscriber and then maintains that information in its VLR at least for the duration that the subscriber is roaming in the visiting service area.

As is known to those skilled in the art, each IMEI is a unique 15 digit number assigned to an individual MS that can be used to determine information associated with the MS, including the manufacturer and MS model type. The IMEI received by network 102 is preferably stored in IMEI database 104. Preferably, IMEI database 104 contains IMEI information associated with mobile stations of subscribers to network 102. For example, MSC 108 can forward to IMEI database 104 information such as an IMEI number of MS 106 after it is requested by network 102 and initially stored in VLR/HLR 110.

Preferably, IMEI database 104 also contains hardware information concerning commonly used mobile station models. Such information may include an MS model, mail capability, and enhanced features associated with each of a plurality of MS models, among other information. This information may be periodically collected by system 100 and entered into IMEI database 104. Alternatively, this information may be located in a separate hardware database (not shown). Referring again to FIG. 1, by requesting the IMEI number of registering mobile station 106, system 100 can create a contact mobile station table that lists IMEI number, MS 106 phone number or other information that may be contained on the SIM card of MS 106, and MS 106 hardware model. Additionally, using the IMEI number, system 100 may determine the functional capabilities of MS 106 by referring to its internal table of hardware/functional specifications for each of the various types of known mobile communication devices.

The IMEI information stored in IMEI database 104, also preferably includes, as mentioned above, information related to the user of MS 106 via the SIM card in the phone. In this manner the information in IMEI database 104 allows a service provider to know at any given time what kind of communication device a particular user is currently using. Such information may allow the service provider to tailor its service to that customer in a manner most efficient and effective to both the service provider and the mobile subscriber.

Figure 2:
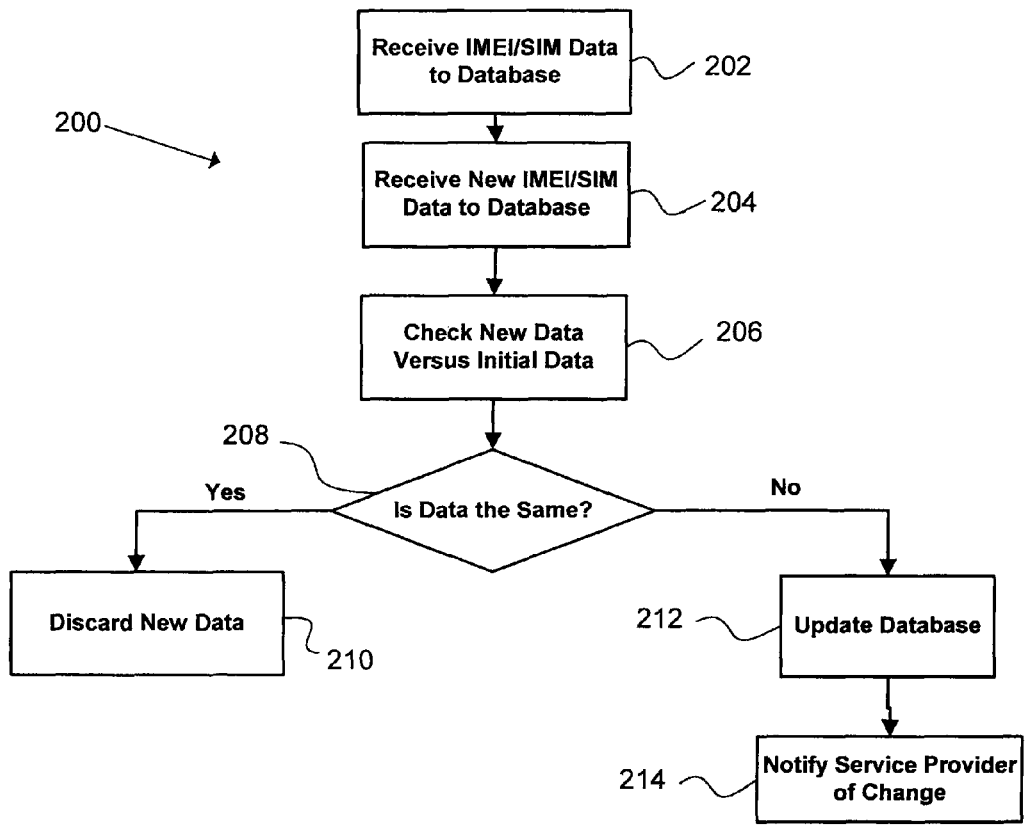
FIG. 2 is a flow chart showing an exemplary method for receiving and handling subscriber/device data in accordance with the present invention.

FIG. 2 depicts an exemplary process 200 for initially recording an IMEI/SIM data pair and for updating the IMEI/SIM record as that information changes. Initially, at step 202, the IMEI/SIM data is entered into IMEI database 104 when the mobile station is registered on the network 102 for the first time. This information may be input directly into the database by a customer service representative, or it may be possible that information is transmitted to the database directly from the mobile station itself. Next, at step 204, the IMEI/SIM data is again received at IMEI database 104.

System 100 then, at step 206, checks the most recent IMEI/SIM data versus the data currently stored in IMEI database 104. At step 208, system 100 checks to see if the data is the same as what was previously contained in IMEI database 104. If the IMEI/SIM data is the same as what is already contained in IMEI database 104, the new record may simply be discarded at step 210. If, however, IMEI/SIM information is found to be different from that contained in IMEI database 104, then system 100 may update IMEI database 104 with the latest IMEI/SIM data at step 212. Although process 200 is depicted as discarding data that does not reflect a change in the IMEI/SIM data, it may also be desirable to store all instances of IMEI/SIM data transmission to maintain a full historical view of activity by the users. Finally, upon detection of a change, system 100 may then notify the service provider (or any other application or entity that could utilize such information) that the mobile subscriber is using a new mobile station at step 214, and thus allow the service provider or other entity/application to act accordingly, such as by configuring the new mobile station to support its new features.

One purpose of IMEI collection and alerting is to provide notification to different applications connected to the IMEI database server that a subscriber has changed its SIM card from one MS to another. There are several different methods of detecting the IMEI change. Three of these exemplary methods are Call Detail Record (CDR) collection, SIM card applications, and enhanced switch features and A-bis links monitoring. Each of these may have advantages over the other that may be relative to the applications connecting to the IMEI server.

Within a CDR for voice and data calls is often contained IMEI, MSISDN, IMSI, and other non-pertinent information for IMEI collection. System 100 can read the collected CDRs and may store the IMEI or IMEI/SIM combination to the database. Alternatively, the combination may be compared to the existing information in the database to see if an update is necessary in the manner described in relation to FIG. 2.

Another exemplary method involves monitoring and enhanced switch methods. In this example, IMEI data is monitored using one of numerous monitoring capabilities of the network, such as, for example, using A-bis, MSC, HLR, VLR and signal transfer point (STP) to monitor IMEI data that is transmitted from the MS.

A third exemplary method for updating the IMEI database is to place an application on the SIM card itself. This resident application can read the IMEI each time the phone powers up, for example, or based on any other criteria programmed into the application. The SIM application may be programmed so that if the IMEI/SIM information is the same as the previous check by the SIM application, then nothing happens. If, however, the SIM application determines that a change has occurred in the IMEI/SIM information, it could then transmit such information to the IMEI database, at which time the database can be checked versus its latest IMEI/SIM information and, if necessary, alert whatever applications should be alerted of the change.

Alternatively, a fourth exemplary method for updating the IMEI database may be provided by the VLR/HLR 110. In particular, the VLR/HLR 110 may inform the IMEI database of all changes to the IMEI/SIM database information that it has captured, and/or was aware of, as a result of various normal operating events that occur in the network, such as in the situation where a mobile station periodically registers with the network and its IMEI/SIM is automatically registered with the VLR/HLR 110, or the like.

It should be noted that while it may be desirable to capture all instances of changes to the IMEI/SIM database information, it may also be desirable to implement a function that only creates an alert regarding a change if the system recognizes that the IMEI/SIM information has changed for a significant duration. For example, it is possible that a first user may encounter a second user who has a device that the first user wishes to try out. In this scenario, the first user may temporarily swap his/her SIM card into the second user's device for only a short period of time long enough to enable the first user to assess the second user's device. It may not be desirable in such a situation for the system to alert that this short duration SIM swap has occurred. Accordingly, the system may only acknowledge the SIM swap if the SIM card remains in the new device for an extended period of time. Additionally if the system receives a series of IMEI/SIM data records over a short period of time where a single record reflecting a SIM swap occurs between two records reflecting that the user's SIM card is in the user's original device, the system may recognize this as the above-described type of temporary SIM swap and effectively ignore the short-duration SIM discrepancy.

As with the method described in FIG. 2, it may also be desirable to transmit all data collected by the SIM application so as to provide a more robust history related to the IMEI/SIM information in the IMEI database. The form of update related to the SIM application could take the form of, for example, a short message service (SMS) message containing the updated IMEI/SIM information. The update may also be an e-mail, unstructured supplementary services data (USSD) message, Universal Mobile Telecommunications System (UMTS), or any other suitable manner of transmitting the IMEI/SIM information from the MS to the IMEI database. Each of the above-described monitoring/data collection methods is intended as exemplary only and one of skill in the art will comprehend that other data collection methods may be applicable for collecting IMEI/SIM data and transferring it to the IMEI database.

As mentioned above, by implementing these or other methods of updating the IMEI database, downstream and external applications, for example, would be able to receive information (from historical to near-real-time, depending on the need of the particular applications) about devices used by the customer. This information can be used to control and track numerous parameters that may aid in improving the customer experience, controlling services received by the customer, and gaining insight into customer behavior.

The IMEI database can hold this information and allow it to be accessed in a manner appropriate to the application-individual queries for a real-time content application, bulk database replication for a query-intensive application with less sensitivity to timeliness, and large-scale queries for datamining and historical research needs.

Many benefits may be achieved through better knowledge of the customers' mobile devices in use. It should be noted that the database would be intended merely as a repository for information regarding a user and the device currently in use. It is possible, however, that the database could actively transmit information regarding IMEI/SIM changes, if so desired. The various applications that could benefit from that information would be responsible for querying and/or receiving the information from the IMEI database in a manner that is meaningful to that particular application.

In a first example of the type of use for the information contained in the IMEI database it may be desirable to track user behavior versus particular mobile devices to check, for example, whether users of certain devices tend to use their mobile communications device in a manner that generates more revenue for the service provider than users of other devices. Such knowledge can allow service providers, content providers, and hardware providers, among others, to optimize user experience across all handsets and to allow for maximization of revenue and profits. Such user/device behavior could be tracked, for example, by using the database in a historical mode. Information regarding calls (including timestamps) may then be cross-referenced with billing data to determine any type of usage activity or behavior. The findings from such analysis may then be extrapolated or otherwise analyzed to reach actionable conclusions regarding customer behavior viz-a-viz the particular mobile communications device.

Additionally, a user from a legacy GSM market may be using a device that does not allow an optimal user experience. It may be valuable to identify such subscribers on a closer to real-time basis to inform the subscriber of the benefit(s) of switching to an updated handset. Similarly, the system could be developed to notify a customer who is using a device that does not support his/her choice of features or products. Such notification could be done by SMS, MMS, e-mail or any number of a ways of notification. The IMEI database could be used in this instance as an adjunct to the roaming systems, to identify devices that are suspect regarding roaming services. Customers who are roaming inappropriately can be notified through an SMS or other notification when they return to their home area to switch devices and, for example, improve their service or lower their costs.

In another example, a service provider could offer to national retailers the ability to control shrinkage by using the IMEI database to provide whitelist/blacklist capabilities, for example, for "phone in a box" services. In this instance, when devices are sold to the national retailer, they may be inserted into the IMEI database with a "not sold" status. Upon the device being sold, the IMEI database record may be converted to a "sold" status, which then allows the device to be activated by the customer. The IMEI database can feed a point of sale activation (POSA) system with the devices in use in the network and feed other aspects of the network with devices that should not be allowed to access the network.

Similar to the above, devices may be blacklisted entirely if they are reported lost or stolen. If a user loses his/her device or has it stolen, he/she may report this to the service provider. Whereas previously anyone who came into possession of such a lost or stolen phone could simply insert a valid SIM card and use the phone with impunity, the IMEI database would allow service providers to learn of such illegal use and terminate service to a user whose SIM card has been inserted into a blacklisted phone.

In yet another example, the IMEI/SIM data may be provided to a customer care representative to enhance service to the customer. IMEI information may be retrieved from the IMEI database based on the most recent transmission, or it may be possible for the customer care representative to initiate a transfer of IMEI information to the database while in communication with the customer to receive the most updated information regarding that user's communications device. In this manner, the customer care representative will have access to the details regarding the customer's device and can provide the highest level of service without need for asking the user questions regarding the type of device in use.

Another use for the IMEI database information is to aid in prevention of sideways movement of devices from pre-paid to post-paid. Often times, mobile communications devices and accessories are packaged together and sold specifically for use as pre-paid devices. Because the airtime usage rates for pre-paid versus post-paid are often higher, service providers offer these specially packaged phones at discounts. Also, in order to promote the selling of pre-paid devices, retailers are often provided a commission for selling such packages. If a phone is originally sold as a pre-paid phone, it may be so designated within the IMEI database. If at some point a user who is signed up for a post-paid plan inserts his/her SIM card into the pre-paid phone, the phone could be blacklisted if it is appropriate to do so, or at the very least, the commission that was to be or has already been paid to the retailer could be revoked or denied.

In another example, the IMEI database could be used to determine if certain types of communications should be sent from one device to another. For example, one user may have MMS messaging capability while another user does not. The network, before attempting to transmit the MMS, or other such enhanced communication, may query the database to see if the target user has the ability to accept the MMS message. If not, the initiating user may be informed that the MMS message cannot be sent rather than sending the MMS message anyway (and tying up the network with unnecessary processing) and never making the sender aware that the MMS message could not be received. As mentioned above, this and other functionality associated with the IMEI database described herein are disclosed in more detail in the aforementioned U.S. application Ser. No. 10/902,808, now U.S. Pat. No. 7,333,836, entitled "System and Method for Providing Mobile Device Capability to a Wireless Network Subscriber" by Emily Soelberg, filed Aug. 2, 2004.

Other than receiving such notifications from the network, it would be desirable for use and maintenance of the IMEI database to be essentially transparent to the customer. Such verification and database updating and querying would preferably not create any noticeable change in service speed or appearance to the user.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A server for use with a plurality of mobile stations each having an international mobile equipment identity ("IMEI") and a plurality of functional capabilities, the server comprising:
    a programmed routine configured to
        determine whether a device capability data for one of the plurality of mobile stations indicates the associated IMEI is the same as the IMEI that is received with a SIM data to the programmed routine, the device capability data associating an associated IMEI of each mobile station with a plurality of functional capabilities of the mobile station,
        identify at least one new functional capability associated with the IMEI but not associated with the associated IMEI upon determining the IMEI is not the same as the associated IMEI, and
        initiate configuration of the mobile station to support the at least one new functional capability upon determining the IMEI is not the same as the associated IMEI,
        wherein a determination of whether the device capability data for the IMEI is associated with at least one new functional capability not associated with the associated IMEI is not performed upon determining the IMEI is the same as the associated IMEI.

2. The server in claim 1, wherein the device capability data includes a plurality of functional capabilities obtained by referencing a hardware information for the mobile station.

3. The server in claim 1, wherein the programmed routine is further configured to notify an entity that the IMEI is different than the associated IMEI.

4. The server in claim 1, wherein the IMEI and the SIM data are sent to the programmed routine from a mobile switching center, the mobile switching center configured to receive the IMEI and the SIM data from each mobile station.

5. The server in claim 4, wherein the mobile switching center is further configured to forward the IMEI and the SIM data of each mobile station to at least one of a home location register and a visitor location register.

6. The server in claim 1, wherein the device capability data is stored in an IMEI database in communication with the programmed routine.

7. The server in claim 1, wherein the IMEI and the SIM data are received by the programmed routine in the form of at least one of a short message service message, a multimedia message service message, an e-mail message, and an unstructured supplementary services data message.

8. A method for a mobile communications network including a plurality of subscriber identity modules including SIM data, each subscriber identity module being removably coupled to one of a plurality of mobile stations, each mobile station having an international mobile equipment identity ("IMEI") and a plurality of functional capabilities, and each mobile station being configured to transmit the SIM data and the IMEI, the method comprising:
    initiating configuration of one of the mobile stations to support at least one functional capability identified as associated with the IMEI received with a SIM data to the mobile communications network but not associated with an associated IMEI of a device capability data for the mobile station upon determining the IMEI is not the same as the associated IMEI, the device capability data associating an associated IMEI of each mobile station with a plurality of functional capabilities of the mobile station,
    wherein a determination of whether the device capability data for the IMEI is associated with at least one new functional capability not associated with the associated IMEI is not performed upon determining the IMEI is the same as the associated IMEI.

9. The method in claim 8, further comprising storing the IMEI and the SIM data in a history.

10. The method in claim 8, further comprising referencing a hardware information for the mobile station to determine the at least one new functional capability.

11. The method in claim 8, further comprising notifying an entity that the IMEI is different than the associated IMEI.

12. The method in claim 8, further comprising forwarding the IMEI and the SIM data of each mobile station to at least one of a home location register and a visitor location register.

13. The method in claim 8, further comprising receiving the IMEI and the SIM data in the form of at least one of a short message service message, a multimedia message service message, an e-mail message, and an unstructured supplementary services data message.

14. A device for use with a mobile communications network, the device comprising:
   a subscriber identity module (SIM);
   a SIM application stored on the SIM, the SIM application configured to determine whether an international mobile equipment identity (IMEI) is the same as a previous IMEI as previously checked by the SIM application, and transmit the IMEI to the mobile communications network upon determining that the IMEI is not the same as the previous IMEI,
   wherein the IMEI is not transmitted upon determining the IMEI is the same as the previous IMEI;
   wherein the mobile network initiates configuration to support at least one new functional capability identified as associated with the IMEI but not associated with the previous IMEI of a device capability data upon determining the IMEI is not the same as the previous IMEI, the device capability data associating a previous IMEI with a plurality of functional capabilities.

15. The device in claim 14, wherein the SIM application is further configured to transmit the IMEI to the mobile communications network as at least one of a short message service message, a multimedia message service message, an e-mail message, and an unstructured supplementary services data message.

16. The device in claim 14, wherein the SIM application is further configured to notify an entity in communication with the mobile communications network that the IMEI is different than the previous IMEI.

17. The device in claim 14, wherein the SIM application is further configured to transmit the IMEI and the SIM data to at least one of a home location register and a visitor location register.

18. The device in claim 14, wherein the SIM application is further configured to store the IMEI and the SIM data in a history.

19. The device in claim 14, wherein the SIM application is configured to transmit the IMEI and the SIM data to a mobile switching center in communication with the mobile communications network.

20. The device in claim 14, wherein the SIM application is further configured to receive configuration to support the at least one new functional capability.

* * * * *